US009104445B2

(12) United States Patent
Kim et al.

(10) Patent No.: US 9,104,445 B2
(45) Date of Patent: Aug. 11, 2015

(54) APPARATUS AND METHOD FOR SCALABLE APPLICATION SERVICE

(75) Inventors: Kyung-Won Kim, Seoul (KR); Tae-Beom Lim, Yongin-si (KR); Seok-Pil Lee, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 801 days.

(21) Appl. No.: 13/359,158

(22) Filed: Jan. 26, 2012

(65) Prior Publication Data

US 2013/0018981 A1    Jan. 17, 2013

(30) Foreign Application Priority Data

Jul. 15, 2011    (KR) .................. 10-2011-0070658

(51) Int. Cl.
*G06F 15/16*    (2006.01)
*G06F 9/445*    (2006.01)
(52) U.S. Cl.
CPC .................... *G06F 9/4451* (2013.01)
(58) Field of Classification Search
CPC ............. H04L 65/60; H04L 67/2823
USPC ................................. 709/205, 217
See application file for complete search history.

(56) References Cited

U.S. PATENT DOCUMENTS

| 6,308,325 | B1 | 10/2001 | Dobbek |
| 7,065,754 | B1 | 6/2006 | Coutant et al. |
| 7,730,468 | B1 | 6/2010 | Trowbridge |
| 2004/0263530 | A1 | 12/2004 | Sahuc et al. |
| 2006/0235925 | A1 | 10/2006 | Rossotto et al. |
| 2009/0199218 | A1 | 8/2009 | Goring et al. |
| 2009/0249296 | A1 | 10/2009 | Haenel et al. |
| 2010/0281102 | A1* | 11/2010 | Chinta et al. .................. 709/203 |

FOREIGN PATENT DOCUMENTS

| CN | 1582565 A | 2/2005 |
| CN | 1658608 A | 8/2005 |
| CN | 1765101 A | 4/2006 |

OTHER PUBLICATIONS

Yoon et al; Background for Proposing Scalable Markup Language for AIT's Present Content Elementary Service; MPEG Meeting, Oct. 2010; p. 1-4.*
European Patent Office, European Search Report issued in corresponding EP Application No. 12152109.0, dated Oct. 9, 2012.
Lim et al., "Scalable Application Framework to Support IPTV Client Device Independence Based on MPEG-21," IEEE International Conference on Consumer Electronics (ICCE), 2011, pp. 859-860.
(Continued)

*Primary Examiner* — Glenford Madamba
(74) *Attorney, Agent, or Firm* — Sughrue Mion, PLLC

(57) ABSTRACT

There are one or more pre-parsers for extracting one or more components from integrated document in a network system comprised of at least one terminal, a server, and at least one repeater, where the pre-parsers are installed in one or more of the terminal, the server, and the repeater. The server may create a primary SADL integrated document and transmit it to the terminal or the repeater. And, the repeater may transmit secondary SADL integrated document or the application, created by applying delivery context to the primary SADL integrated document to the terminal. The terminal may also apply delivery context to the primary SADL integrated document or the secondary SADL integrated document, thereby creating an application optimized for the terminal.

2 Claims, 16 Drawing Sheets

(56) References Cited

OTHER PUBLICATIONS

Lee et al., "Request for Providing Usage Scenarios and Guidance for Implementation of MPEG-M," MPEG Meeting, 2011, pp. 1-2.

Yoon et al., "Background for Proposing Scalable Application Markup Language for AIT's Present Content Elementary Service," MPEG Meeting, 2010, pp. 1-4.

* cited by examiner

APPARATUS AND METHOD FOR SCALABLE APPLICATION SERVICE

CROSS-REFERENCE TO RELATED APPLICATION

This application claims the benefit under 35 U.S.C. §119 (a) of a Korean Patent Application No. 10-2011-0070658, filed on Jul. 15, 2011, the entire disclosure of which is incorporated herein by reference for all purposes.

BACKGROUND

1. Field

The following description relates to a scalable application service, and more particularly, to a scalable application service that is serviced in a network environment where there are various terminals.

2. Description of the Related Art

With development of information communication technologies, more various kinds of electronic devices are being developed. Also, along with rapid development of mobile communication technologies, various kinds of mobile electronic devices as well as fixed-type electronic devices are being introduced. In the case of a desktop computer which is a representative fixed-type electronic device, the kinds of products are more and more diversified with performance enhancement. Meanwhile, typical analog electronic devices (for example, television) are being digitalized, and other home and office electronics (for example, washing machine, refrigerator, air conditioner, facsimile, printer, etc.) are also combined with information communication technologies to thus have enhanced performance while being further diversified.

Diversification in kind of electronic devices is significant in mobile devices. For example, a laptop computer, a cellular phone, a MP3 player, a digital camera, a hand-held multimedia player, a navigations, an electronic dictionary, an E-book reader, a DMB receiver, etc. have been already developed and widely being utilized. Also, recently, a smart phone, a smart pad, a tablet PC, etc. have been newly introduced, and related industries are rapidly being expanded. Accordingly, such mobile devices are more and more diversified according to their purposes and performance.

Besides, some functions of such fixed-type and/or mobile electronic devices are integrated. For example, a camera function, a GPS function, a multimedia reproducing function, etc. are presently adopted in most of electronic devices, and accordingly applications based on these functions are installed in the electronic devices when they are manufactured, or implemented to be able to be installed in them as necessary. Particularly, most of the electronic devices have a communication function using a wired/wireless network.

However, most of such electronic devices use different platforms and different service framework environments, as well as having different characteristics or performance according to their dedicated functions, and users who utilize the electronic devices also may have different ages, different sexes, different preferences, etc. Also, an electronic device may be used under different use environments according to users' tastes, network environments, etc. In the case of a service, such as a multimedia streaming service and a web service, which provides multimedia content, studies into providing a scalable service in consideration of the unique characteristics (for example, terminal capability, a display size, a supportable resolution, an accessible network, etc.) of various terminals have been conducted.

Recently, with popularization of an IPTV service using the Internet, broadcasting services move from a unidirectional service of providing multimedia content to viewers to an interactive service, and service objects are also being diversified. Along with the trend, the IPTV service is trying to provide applications executable in various terminals, such as TV, a computer, a mobile terminal, as well as providing multimedia data, such as video, audio, images, etc.

Recently, a technical trial to provide a mobile IPTV service through a mobile communication network is being run. When a mobile IPTV service is realized, the IPTV service will be evaluated to an IP convergence service that can be supported in both wired and wireless networks. Particularly, since the mobile IPTV service will be able to be provided through all terminals having a communication function through a mobile communication network, the IPTV service is expected to be able to be supported for various terminals at the same time. Recently, studies into an IPTV service capable of providing multimedia content adaptively to various terminals using a multilayered video coding method, such as scalable video coding (SVC), etc. are being conducted.

However, SVC is a method of hierarchically encoding video content (moving images) to provide the video content to various terminals. Unlike this, an application service provides various contents including video, in the form of a program that is installed in and executable by a user terminal or an engine, such as JAVA, FLASH, etc., and the application service integrates a plurality of factors and/or conditions. When such an application program is reproduced, an application to which integrated factors and/or conditions are reflected can be represented on a GUI of a user terminal.

However, presently, application programs have been provided with a single format regardless of the kinds or characteristics of terminals so far, and standardization or studies into a method of providing application programs optimized for various terminals have not sufficiently been conducted. In other words, IPTV services developed so far have not considered the individual characteristics (for example, performance or display size) of terminals. For example, an application program that reproduces multimedia content, data, etc. provided through an IPTV service has fixed characteristics (for example, image quality, sound quality, security level, the kind or number of content configuring GUI, an accessible range, etc.), and does not provide a service adaptively in consideration of the individual characteristics of terminals. Accordingly, the application program cannot provide an application service optimized for the performance and specification of a specific terminal.

A method of providing an optimized application service in consideration of the performance specification of a terminal has been introduced in which a service provider creates and provides a plurality of formats for GUI in consideration of the performance specifications of various terminals. For example, when a user tries web browsing through a mobile device with a small size of display, a content provider, such as Naver, Daum, etc., enables the mobile terminal to access a web page created in advance for the mobile terminal in order to represent a web suitable for the mobile terminal. However, since the method should create various formats of content in advance and store them in a service server, a service provider had to cover high service cost. Furthermore, creating and storing GUIs optimized for all terminals with various characteristics is practically impossible.

Meanwhile, MPEG-21, which is an international standard defined by the Moving Picture Expert Group (MPEG), is in charge of multimedia framework standardization of a core technology and an integration technology required for electronic trading of digital content. MPEG-21 Digital Item Declaration (DID) (ISO/IEC 2100-2) defines how digital items are described and structurized, as the second part of the MPEG-21. Also, a MPEG-21 Digital Item Adaptation (DIA) (ISO/IEC 21000-7) framework includes a syntax and semantics tool capable of controlling digital items and optimizes the digital items according to users' tendencies and network environments.

However, since the syntax and semantics tool causes a large amount of overhead and have a complicated structure, it is not easy to use the syntax and semantics tool. The MPEG-21 defines a method of processing users' tendencies or information about a network environment, however, suggests no service method capable of applying user viewing state information in various terminal environments.

SUMMARY

The following description relates to an apparatus and method capable of providing an application service to which the unique characteristics of each terminal and/or each server and information about each user's viewing state are reflected in a network environment where there are various terminals.

A pre-parser for extracting one or more components from integrated document in a network system comprised of at least one terminal, a server, and at least one repeater may be installed in one or more of the terminal, the server, and the repeater. According to an aspect, all of the terminal, the server, and the repeater may include pre-parsers, respectively. As a result, the server may create an application optimized for the terminal and transmit the application to the terminal. Or, the server may transmit primary SADL integrated document primarily filtered to the terminal or the repeater. Or, the server may transmit SADL integrated document as it is to the terminal or the repeater. The repeater may transmit the received SADL integrated document, the received primary SADL integrated document, or the received application, as it is, to the terminal, or may apply delivery context to the received SADL integrated document, the received primary SADL integrated document, or the received application and then transmit the resultant primary SADL integrated document, the resultant secondary SADL integrated document, or the resultant application to the terminal. Also, the terminal may apply, when receiving SADL integrated document, primary SADL integrated document, or secondary SADL integrated document from the server or the repeater, delivery content to the received SADL integrated document, the received primary SADL integrated document, or the received secondary SADL integrated document to thereby create an application optimized for the terminal.

Other features and aspects will be apparent from the following detailed description, the drawings, and the claims.

Figure 1:
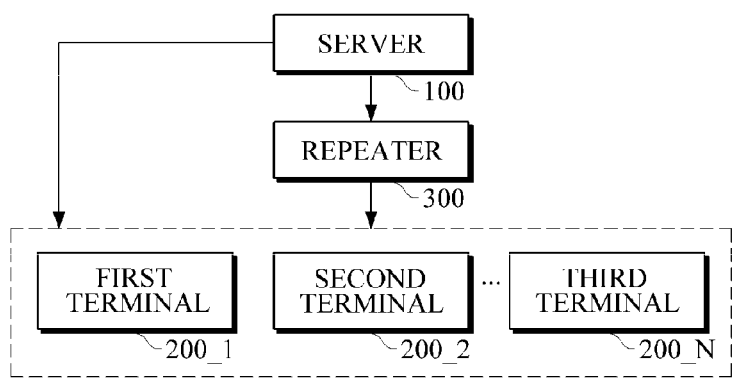
FIG. 1 is a diagram illustrating a configuration example of a network system that can provide an application service.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a configuration example of a network system that can provide an application service. Referring to FIG. 1, the network system includes a server 100 and a plurality of terminals 200_1 through 200_N. Also, the network system may further include a repeater 300 which relays communication between the server 100 and the terminals 200_1 through 200_N.

Each terminal 200_1 through 200_N may be one of various digital devices that can configure a home network system or that can allow users to use various services therethrough. However, the network system is not limited to a home network system and may be any other network system that can be configured using a predetermined communication network (a wired network, a wireless network, a mobile communication network, a short range communication network, a mobile network, etc.). Also, each terminal 200_1 through 200_N may be a mobile device, such as a smart phone, a Personal Digital Assistant (PDA), a cellular phone, a Personal Communication Service (PCS) phone, a hand-held PC, a Global System for Mobile (GSM) phone, a Wideband Code Division Multiple Access (WCDMA) phone, a CDMA200 phone, a Mobile Broadband System (MBS) phone, etc. Also, the terminal 200_1 through 200_N may be a Personal Computer (PC), a tablet PC, a laptop computer, a digital TV, etc.

The terminals 200_1 through 200_N are connected to the server 10 in a wired or wireless network for communication with the server 100. Here, the terminals 200_1 through 200_N may be connected to the server 100 directly or via the repeater 300 of the corresponding network system. If the terminals 200_1 through 200_N are connected directly to the server 100, the terminals 200_1 through 200_N communicate directly with the server 100, however, if the terminals 200_1 through 200_N are connected to the server 100 via the repeater 300, the terminals 200_1 through 200_N communicate with the server 100 through the repeater 300. Also, the repeater 300 may relay all of the terminals 200_1 through 200_N or there may be provided a plurality of repeaters to distributively relay the terminals 200_1 through 200_N.

The server 100 provides, when receiving an application request from a specific terminal 200_1 through 200_N, an application optimized for the terminal to the corresponding terminal. In order to provide an optimized application to each terminal 200_1 through 200_N, the server 100 may use, when receiving an application request from a specific terminal 200_1 through 200_N, a user' viewing state information or delivery context (DC) received directly from the terminal 200_1 through 200_N or via the repeater 300. Or, the server 100 may use both the received DC and pre-stored DC about the terminals 200_1 through 200_N. A method of using DC to create an application optimized for each terminal 200_1 through 200_N will be described later.

The repeater 300 relays communication between the terminals 200_1 through 200_N and the server 100. At this time, the repeater 300 may perform predetermined processing on received data before relaying communication between the terminals 200_1 through 200_N and the server 10. For example, the repeater 300 may remove a part of DC included in an application request received from the terminals 200_1 through 200_N and transfer the resultant application request to the server 100. Also, the repeater 30 may include DC stored therein in an application request received from the terminals 200_1 through 200_N and transfer the resultant application request to the server 100. Furthermore, the repeater 300 may transfer an application received from the server 100 to the terminals 200_1 through 200_N without any addition or conversion, or the repeater 300 may use DC about the terminals 200_1 through 200_N, stored therein, or DC about the terminals 200_1 through 200_N, removed when transferring it to the server 100 to thereby transfer a more optimized application to each of the terminals 200_1 through 200_N. Meanwhile, communication between the terminals 200_1 through 200_N and the server 100 may be performed through a single repeater 300 or through two or more repeaters 300.

According to the configuration of the network system, the terminals 200_1 through 200_N may receive applications optimized for them from the server 100 or the repeater 300. In this case, the terminals 200_1 through 200_N may reproduce the received application as it is. However, according to an aspect, all or a part of the terminals 200_1 through 200_N may apply DC about them to data (for example, integrated document which will be described later) received from the server 100 or the repeater 300 to create applications optimized for them and then reproduce the applications.

Hereinafter, a procedure of providing an application service when the terminals 200_1 through 200_N communicate with the server 100 directly or via the repeater 300 that simply relays communication between the terminals 200_1 through 200_N and the server 100, and a procedure of providing an application service when the repeater 300 contributes to provision of an optimized application to each terminal 200_1 through 200_N, that is, when DC is used to create an optimized application will be described respectively. Also, in each of the procedures of providing an application service, the cases where the server 100 uses DC, where the repeater 300 uses DC, and where the terminals 200_1 through 200_N use DC will be described respectively.

First Example

Figure 2:
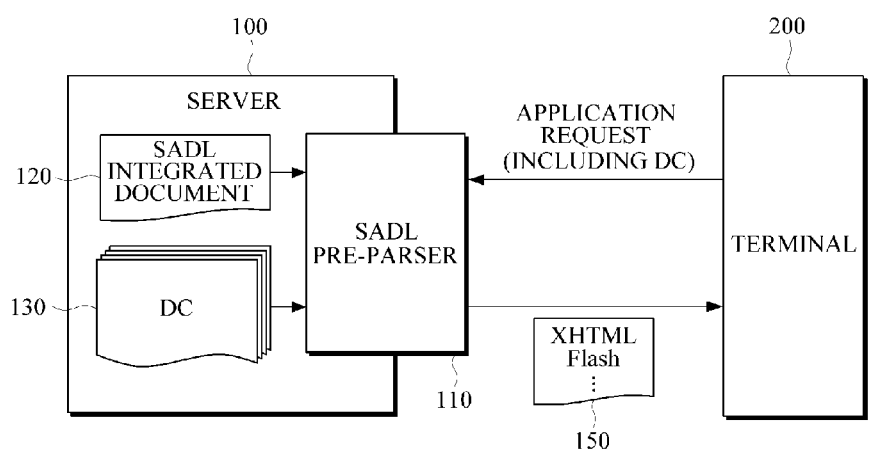
FIG. 2 is a view for explaining an application service method according to a first example.
Figure 3:
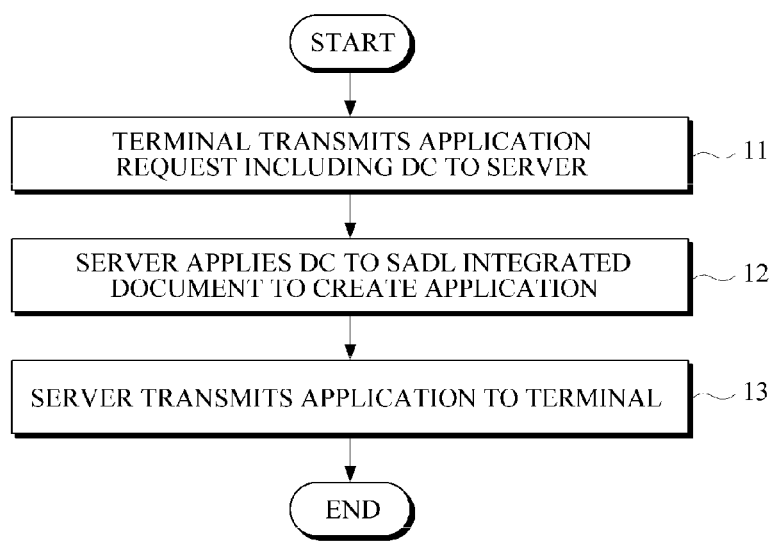
FIG. 3 is a flowchart illustrating the application service method according to the first example.

FIG. 2 is a view for explaining an application service method according to a first example, and FIG. 3 is a flowchart illustrating the application service method according to the first example. The first example corresponds to the case where a terminal 200 communicates with a server 100 directly or via a repeater (in the following description related to the first, second and third examples, for convenience of description, the repeater is neither shown nor described) that simply relays communication between the terminal 200 and the server 100, wherein only the server 100 uses DC. In the current example, there is no limitation on whether or not a pre-parser capable of performing the same function as a pre-parser 110 of the server 100, which will be described later, is installed in the terminal 200.

Referring to FIGS. 2 and 3, the terminal 200 transmits an application request including DC 130 about the terminal 200 to the server 100 (11). That is, the server 100 receives an application request including DC from the terminal 200. In order to transmit an application request together with DC, the terminal 200 may perform a process of extracting needed DC. Also, the application request which the terminal 200 transmits to the server 100 includes DC about the terminal 200. The DC included in the application request may contain all or a part of information required for creating an optimized application. The case where the DC contains a part of information required for creating an optimized application may be the case where DC has been already stored in the server 100, or no DC may be included in an application request that is transmitted from the terminal 200, due to the reason of security, network traffic, etc.

DC is a factor that decides a current viewing state of a user who reproduces and executes an application through his or her own terminal, and may include various kinds of information. For example, a user's viewing state information may be classified as follows, however, this is only exemplary. DC may enable various services according to a method of applying the DC and timings at which the DC is applied.

1. Device Capability: terminal's performance information (the type of terminal, a memory size, memory compatibility information, the kind of OS, OS version, a display size, a maximum supportable resolution, etc.)
2. Service Policy: information related to a service policy (a service provider's policy, such as users' ranks, information about subscription, security information, information about content limitation, etc.)
3. User information: users' personal information (users' preference information, users' ages, a current time, users' languages, users' cultures, etc.)
4. Viewing State: environmental information that changes in real time (the bandwidth of an available network, the brightness of a peripheral environment, etc.).

Referring again to FIGS. 2 and 3, the server 100 which has received the application request from the terminal 200 applies the DC 130 to thereby create an application optimized for the corresponding terminal 200 (12). The DC 130 is DC about the terminal 200, included in the received application request. The server 100 may use both the received DC 130 and DC 130 stored therein to create the application optimized for the terminal 200.

According to an aspect, in order to use the DC 130 to create an application optimized for the terminal 200, the server 100 may store Scalable Application Description Language (SADL) document or SADL integrated document 120 therein, wherein the SADL document or the SADL integrated document may be based on scalable user interface technology. The SADL integrated document 120 may be stored in database of the server 100 or in another data server that can communicate with the server 100. The SADL integrated document 120 may be written using one of mark-up languages that have been newly defined by the present applicant.

Figure 4:
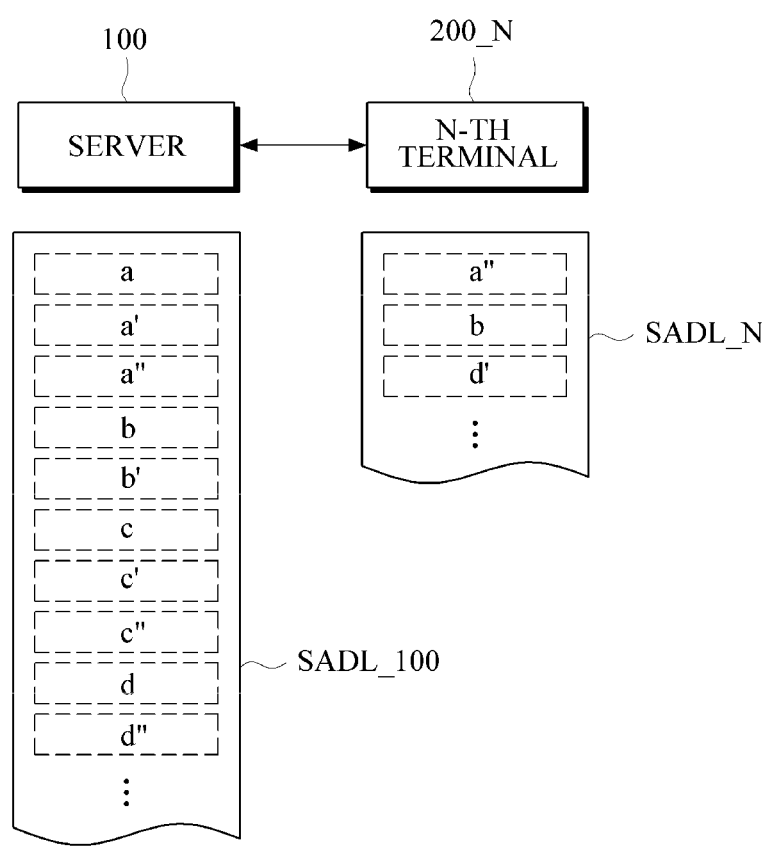
FIG. 4 is a view for explaining a process of creating an application optimized for a specific terminal using integrated document stored in a server.

FIG. 4 is a view for explaining a process of creating an application optimized for a specific terminal 200_N using SADL integrated document SADL_100 stored in a server 100. Referring to FIG. 4, the SADL integrated document SADL_100 may be document into which components (or items) a, a', a", b, b', c, c', c", d, d', . . . written with a mark-up language which enables each of a plurality of terminals to create an application optimized for itself are integrated. Here, different alphabets, such as a, b, c, d, indicate different kinds of user interfaces and/or content, and the same alphabets with different suffixes, such as a, a', a", indicate scalable data from the same user interface or content, etc. That is, the SADL integrated document SADL_100 is integrated document capable of providing applications optimized for the characteristics of various terminals.

When receiving an application request from the terminal 200_N, the server 100 selects and extracts a component from the SADL integrated document SADL_100, thereby creating an application SADL_N optimized for the corresponding terminal 200_N. The DC about the terminal 200_N, that is, DC received from the terminal 200_N and/or stored in the server 100 is used as a filter for selecting or extracting one or more components from the SADL integrated document SADL_100. For example, if the performance of the terminal 200_N is higher than a predetermined level, the component a" that can support the performance may be selected and extracted from among the components a, a', and a". Also, according to a user's rank, the components b and d' suitable for the user may be selected and extracted from among the components b, b', d, and d', and none of the components c, c' and c" may be selected due to a content limitation rule about the corresponding user.

A process of using DC about a specific terminal 200_N to select and extract one or components from SADL integrated document SADL_100 may be performed by a SADL pre-parser 110 (see FIG. 2). The term "SADL pre-parser" is arbitrary and may refer to an arbitrary unit of performing the same function by applying DC about a terminal to integrated document. For example, the "SADL pre-parser" may be a functional unit configuring a pre-parser engine, a parser engine, or a processor of the server 100.

Referring again to FIGS. 2 and 3, the server 100 transmits a created application 150 to the terminal 200. In FIG. 4, the application 150 created by applying DC about the terminal 200_N is denoted as SADL_N. The application 150 transmitted from the server 10 is a program in a format that can be reproduced and executed by the terminal 200. The application 150 includes content containing audio, video, and/or images, and a Graphics User Interface (GUI) to allow a user to select and reproduce the content. For example, the application 150 may have at least one format among XHTML, JAVA, and FLASH. Other than XHTML, JAVA, and FLASH, the application 150 may be more expanded if it is an object-oriented descriptable application program. That is, the application 150 has no limited format and may have a predetermined format that is promised between a plurality of terminals or between a plurality of terminals and a server.

Second Example

Figure 5:
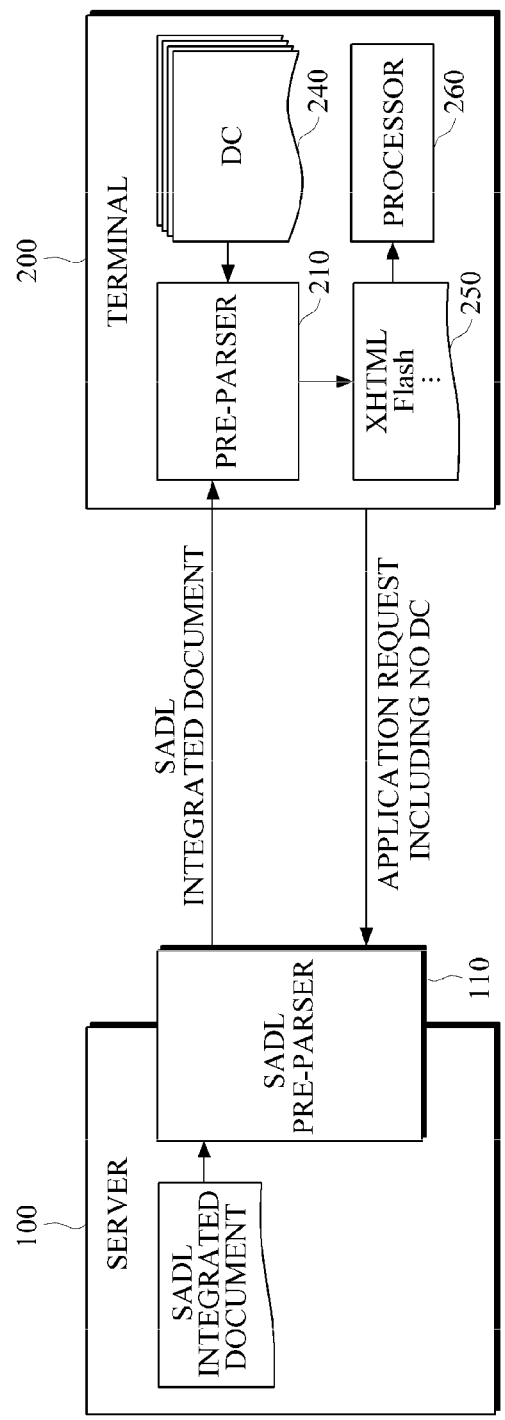
FIG. 5 is a view for explaining an application service method according to a second example.
Figure 6:
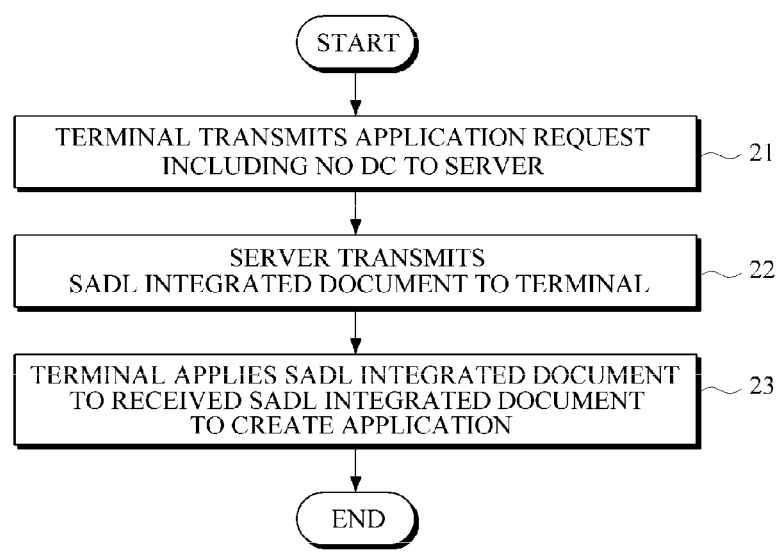
FIG. 6 is a flowchart illustrating the application service method according to the second example.

FIG. 5 is a view for explaining an application service method according to a second example, and FIG. 6 is a flowchart illustrating the application service method according to the second example. The second example corresponds to the case where a terminal 200 communicates with a server 100 directly or via a repeater (not shown) that simply relays communication between the terminal 200 and the server 100, wherein only the terminal 200 uses DC. The second example will be described based on differences from the first example described above, and accordingly details not described in the following description can be referred to the above description about the first example or will be understood by appropriately modifying the first example.

Referring to FIGS. 5 and 6, the terminal 200 transmits an application request to the server 100 (21). That is, the server 100 receives an application request from the terminal 200. According to the current example, the application request includes no DC about the terminal 200. Accordingly, the terminal 200 does not need to perform a process of extracting DC about itself before transmitting the application request, and may perform the process of extracting DC about itself before applying the DC to SADL integrated document to create an application.

Then, the server 100 which has received the application request transmits SADL integrated document corresponding to the requested application to the terminal 200 (22). In the current example, since the terminal 200 includes a pre-parser 210 for applying DC to received document, the server 100 only transmits the SADL integrated document as it is to the terminal 200. According to an aspect, if a part of DC about the terminal 200 is stored in the server 200, the server 100 may apply the part of the DC to SADL integrated document to select and extract one or more components from the SADL integrated document, and transmit (new?) SADL integrated document consisting of only the extracted components to the terminal 200.

Successively, the terminal 200 applies DC 240 about itself to the received SADL integrated document to create an application 250 optimized for the terminal 200 (23). For this, the terminal 200 may perform a process of extracting the DC 240 in advance. The process of applying the DC 240 may be performed by the pre-parser 210 installed in the terminal 200. Details about the process in which the pre-parser 210 creates the application 250 from the SADL integrated document has been described in detail in the first example, and accordingly, a detailed description therefor will be omitted. As a result, one or more components are selected and extracted from the SADL integrated document to thereby create the application 250 in at least one format among XHTML, JAVA, and FLASH. The application 250 is reproduced and executed by a processor 260 and then output through a display and/or audio system, etc. of the terminal 200 so that a user can recognizes the application 250 with his or her sense.

Third Example

Figure 7:
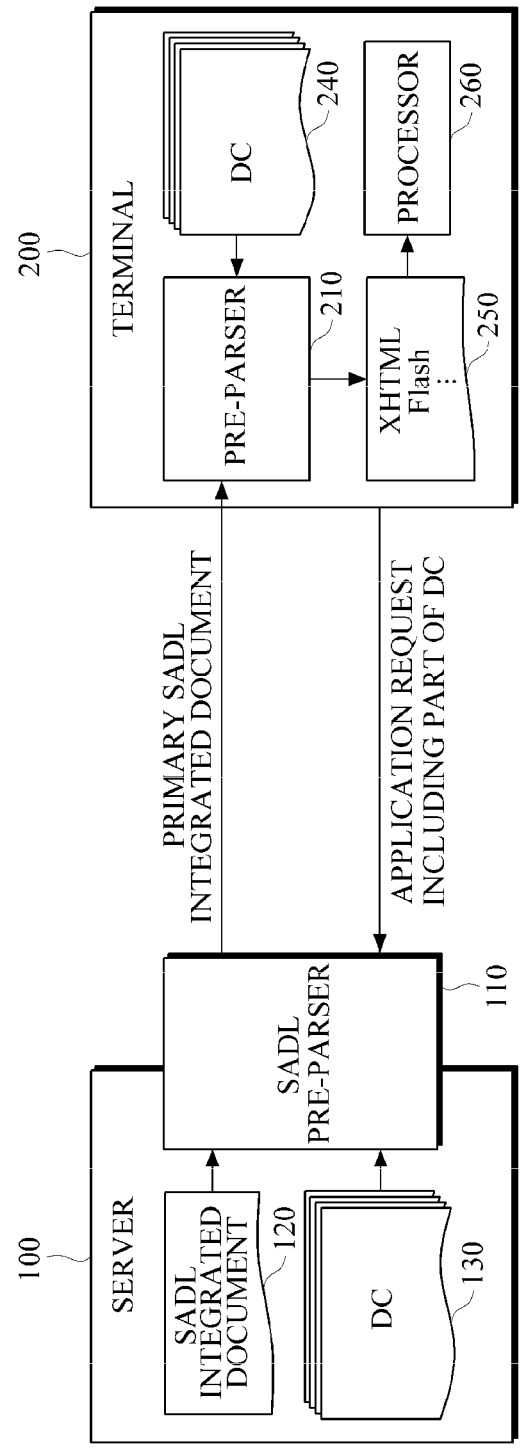
FIG. 7 is a view for explaining an application service method according to a third example.
Figure 8:
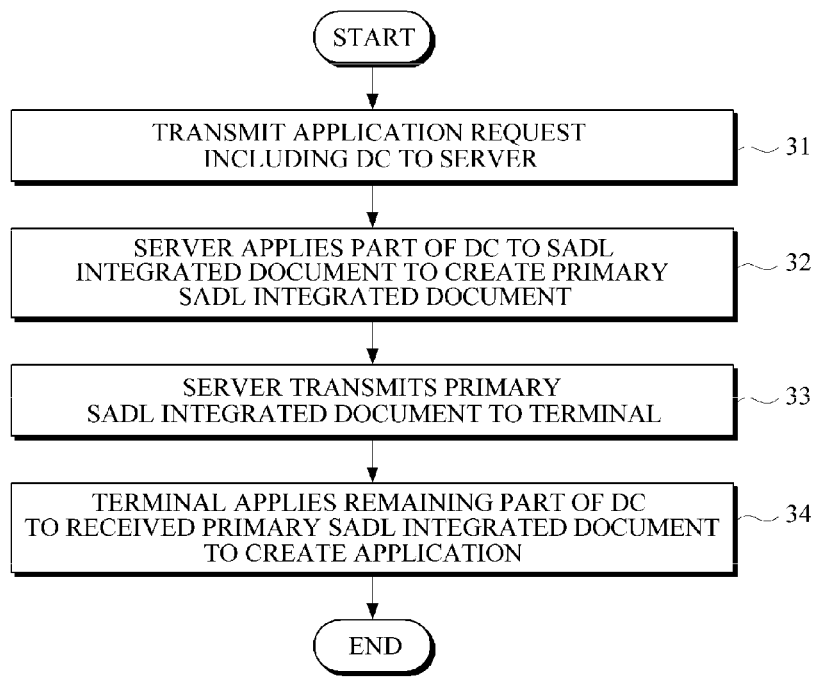
FIG. 8 is a flowchart illustrating the application service method according to the third example.

FIG. 7 is a view for explaining an application service method according to a third example, and FIG. 8 is a flowchart illustrating the application service method according to the third example. The third example corresponds to the case where a terminal 200 communicates with a server 100 directly or via a repeater (not shown) that simply relays communication between the terminal 200 and the server 100, wherein both the server 100 and the terminal 200 use DC. The third example will be described based on differences from the first and second examples described above, and accordingly details not described in the following description can be referred to the above description about the first and second examples or will be understood by appropriately modifying the first and second examples.

Referring to FIGS. 7 and 8, the terminal 200 transmits an application request including DC about itself to the server 100 (31). That is, the server 100 receives an application request including DC about the terminal 200 from the terminal 200. The application request transmitted to the server 100 includes all or a part of DC about the terminal 200, and the following description relates to the case where the application request includes a part of DC about the terminal 200. The case where the application request includes all of DC about the terminal 200 is different from the case where the application request includes a part of DC about the terminal 200, in that the server 100 applies a part of the received DC in operation 32 which will be described later. For this, the terminal 200 may perform a process of extracting DC that is to be transmitted to the server 100. Likewise, in the current example, in the case where DC has been already stored in the server 100 or due to security, network traffic, etc., no DC about the terminal 200 may be included in the application request.

Then, the server 100 which has received the application request from the terminal 200 applies DC 130 (that is, a part of DC about the terminal 200) to SADL integrated document to thus create primary SADL integrated document (32). The process of applying the DC 130 to SADL integrated document to create primary SADL integrated document may be performed by a pre-parser 110 of the server 100. The DC 130 that is applied to create the primary SADL integrated document for the terminal 200 may be a part of the DC about the terminal 200, included in the received application request. Together with the part of the DC included in the application request, all or a part of the DC about the terminal 200, stored in the server 100, also may be applied to the SADL integrated document to create the primary SADL integrated document. Then, the server 100 transmits the primary SADL integrated document to the terminal 200 (33).

Then, the terminal 200 applies the remaining part of the DC about itself to the received primary SADL integrated document to thereby create an application 250 optimized for the terminal 200 (34). For this, the terminal 200 may perform a process of extracting the remaining part (that is, DC 240) of the DC in advance or before operation 31. The process of applying the DC 240 to the primary SADL integrated document to create the application 250 may be performed by a pre-parser 210 of the terminal 200. The process is the same as the process of creating an application from SADL integrated document in the pre-parser 110 of the first example, except that DC is applied to primary SADL integrated document, instead of SADL integrated document, to create an application, and accordingly a detailed description therefor will be omitted. As a result, one or more components are selected and extracted from the primary SADL integrated document to thereby create an application 250 in at least one format of XHTML, JAVA, and FLASH. The application 250 is reproduced and executed by a processor 260 and then output through a display and/or audio system of the terminal 200 so that the user can recognize the application 250 with his or her sense.

Fourth Example

Figure 9:
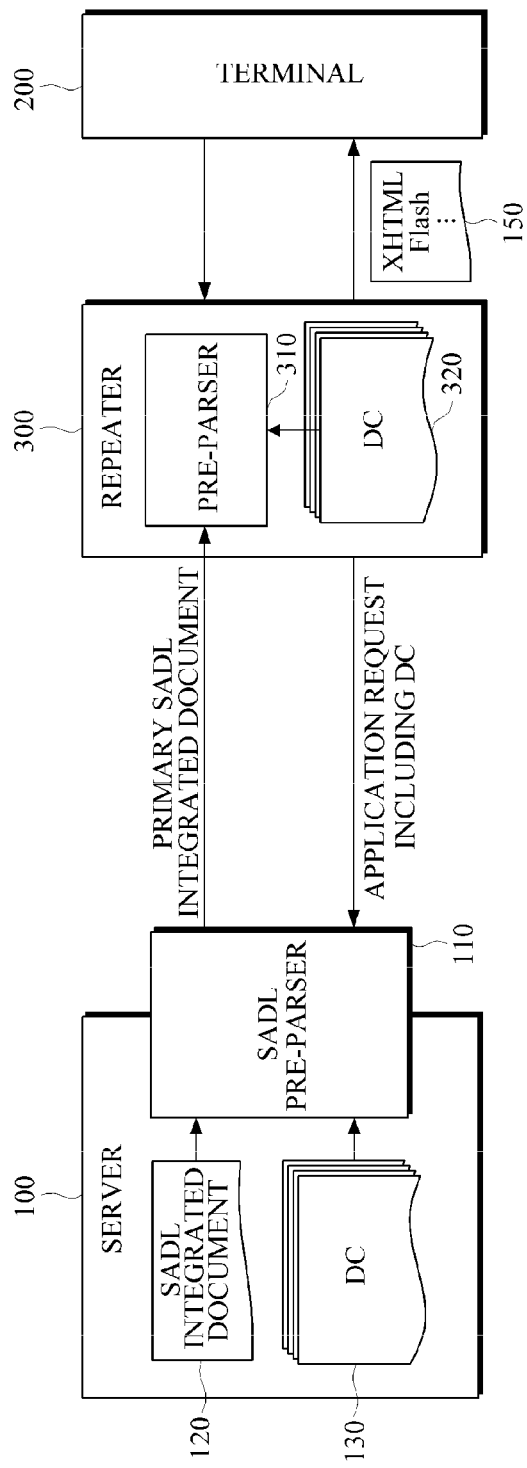
FIG. 9 is a view for explaining an application service method according to a fourth example.
Figure 10:
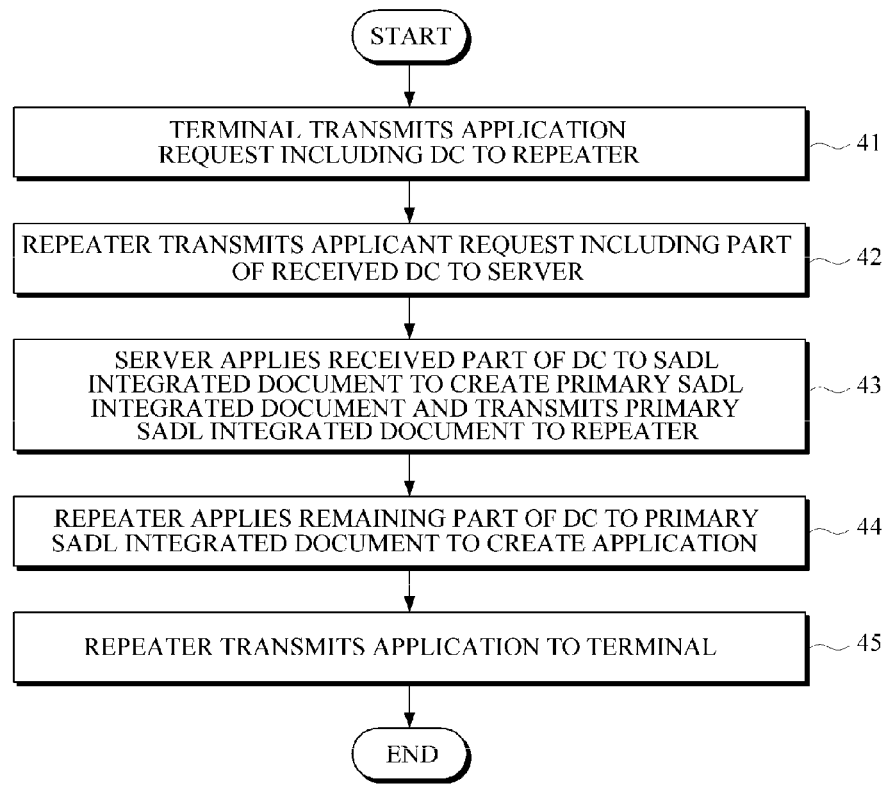
FIG. 10 is a flowchart illustrating the application service method according to the fourth example.

FIG. 9 is a view for explaining an application service method according to a fourth example, and FIG. 10 is a flowchart illustrating the application service method according to the fourth example. The fourth example corresponds to the case where a terminal 200 communicates with a server 100 via a repeater 300, wherein only the server 100 and the repeater 300 use DC. Hereinafter, the fourth example will be described based on differences from the first, second, and third examples described above, and accordingly details not described in the following description can be referred to the above description about the first, second, and third examples or will be understood by appropriately modifying the first, second, and third examples.

Referring to FIGS. 9 and 10, the terminal 200 transmits an application request including DC about the terminal 200 to the repeater 300 (41). That is, the repeater 300 receives an application request including DC about the terminal 200 from the terminal 200. The application request transmitted to the repeater 300 may include all or a part of DC about the terminal 200. For this, the terminal 200 may perform a process of extracting DC that is to be transmitted to the repeater 300. In the fourth example, if DC about the terminal 200 has been already stored in the repeater 200 and/or the server 100, the DC may be not included in the application request.

Then, the repeater 300 transmits the application request received from the terminal 200 to the server 100 (42). The application request that is transmitted from the repeater 300 to the server 100 may include a part of the DC received from the terminal 200. According to an aspect, DC (not shown) about the repeater 300 also may be included in the application request. The DC about the repeater 300 functions to inform the server 100 of the performance of the repeater 300 or network environment information.

Successively, the server 100 which has received the application request from the repeater 300 applies the received part (that is, DC 130) of the DC about the terminal 200 to SADL integrated document to create primary SADL integrated document, and then transmits the primary SADL integrated document to the repeater 300 (43). The process of applying the DC 130 to the SADL integrated document to create the primary SADL integrated document may be performed by a pre-parser 110 of the server 100. Also, the DC 130 that is applied to the SADL integrated document to create the primary SADL integrated document for the corresponding terminal 200 is a part of the DC about the terminal 200, included in the application request. Together with the DC 130 included in the application request, all or a part of the DC about the terminal 200, stored in the server 100, also may be applied to the SADL integrated document to create the primary SADL integrated document.

Then, the repeater 300 applies the remaining part (that is, DC 320) of the DC about the terminal 200 to the received primary SADL integrated document to thereby create an application 150 optimized for the terminal 200 (44). Here, the DC 320 is DC that has not been transmitted to the server 100 in operation 42 although it has been received in operation 41. According to an aspect, the DC about the terminal 200, stored in the repeater 300, also may be additionally applied to the primary SADL integrated document to create the application 150. The process of applying the remaining part of the DC may be performed by a pre-parser 310 of the repeater 300. The process is the same as the process of creating an application from SADL integrated document in the pre-parser 110 of the first example, except that DC is applied to primary SADL integrated document, instead of SADL integrated document, to create an application, and accordingly a detailed description therefor will be omitted. As a result, one or more components are selected and extracted from the primary SADL integrated document to thereby create an application in at least one format of XHTML, JAVA, and FLASH.

Successively, the repeater 300 transmits the created application to the terminal 200 (45). The terminal 200 that has received the application reproduces and executes the application using a processor to output the application through a display and/or an audio system so that a user can recognize the application with his or her sense.

Fifth Example

Figure 11:
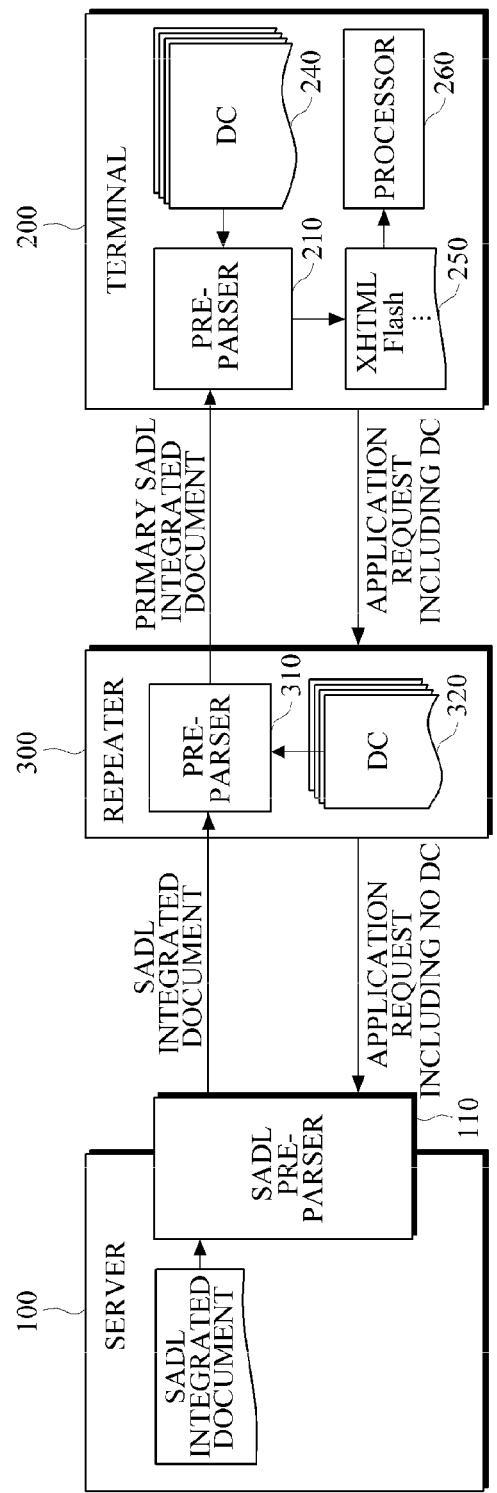
FIG. 11 is a view for explaining an application service method according to a fifth example.
Figure 12:
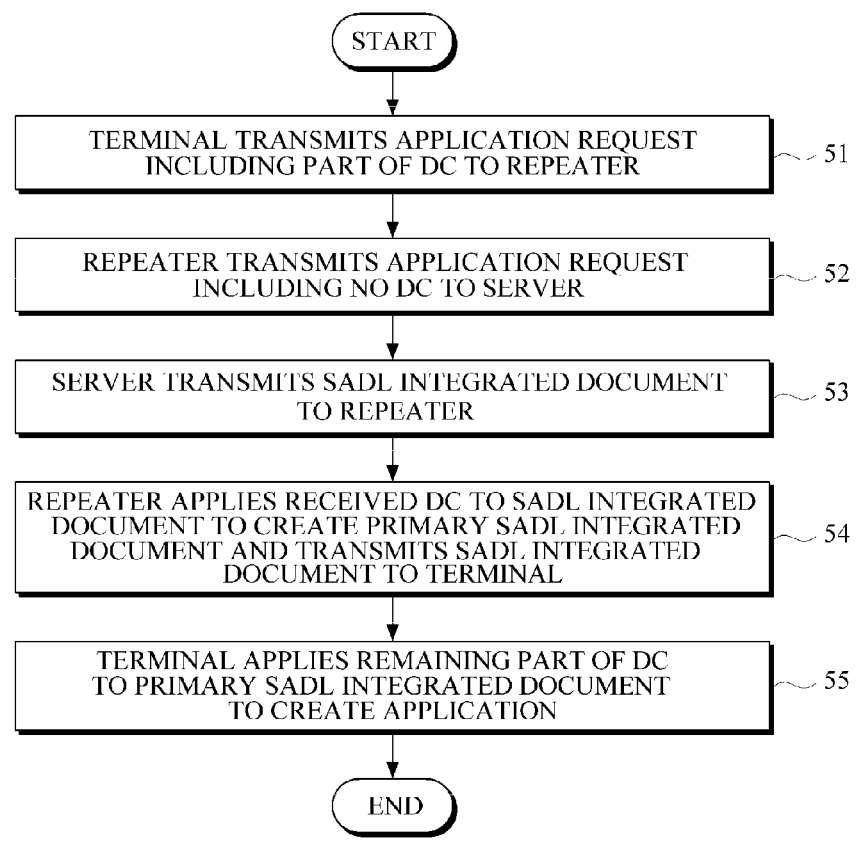
FIG. 12 is a flowchart illustrating the application service method according to the fifth example.

FIG. 11 is a view for explaining an application service method according to a fifth example, and FIG. 12 is a flowchart illustrating the application service method according to the fifth example. The fifth example corresponds to the case where a terminal 200 communicates with a server 100 via a repeater 150, wherein only the repeater 150 and the terminal 200 use DC. The fifth example will be described based on differences from the first through fourth examples described above, and accordingly details not described in the following description can be referred to the above description about the first through fourth examples or will be understood by appropriately modifying the first and fourth examples.

Referring to FIGS. 11 and 12, the terminal 200 transmits an application request including DC about itself to the repeater 300 (51). That is, the repeater 300 receives an application request including DC about the terminal 200 from the terminal 200. The application request that is transmitted to the repeater 300 may include a part of DC about the terminal 200. For this, the terminal 200 may perform a process of extracting a part of DC that is to be transmitted to the repeater 300. Likewise, in the fifth example, if DC about the terminal 200 has been already stored in the server 100 and/or the repeater 100, the DC may be not included in the application request.

Then, the repeater 300 transmits the application request received from the terminal 200 to the server 100 (52). The application request that is transmitted from the repeater 300 to the server 100 may include no DC received from the terminal 200. According to an aspect, DC (not shown) about the repeater 300 may be included in the application request. DC about the repeater 300 functions to inform the server 100 of the performance of the repeater 300 or network environment information.

Successively, the server 100 which has received the application request from the repeater 300 may transmit SADL integrated document corresponding to the requested application to the repeater 300 (53). In the current example, since the repeater 300 and the terminal 200 include pre-parsers 210 and 310 for applying DC, respectively, the server 100 only transmits the SADL integrated document as it is to the repeater 310. According to an aspect, if a part of DC about the terminal 200 is stored in the server 100 or if DC about the repeater 300 is received from the repeater 300, the server 100 applies the part of DC about the terminal 200 or the DC about the repeater 300 to SADL integrated document to select and extract one or more components from the SADL integrated document, creates (new?) SADL integrated document consisting of only the extracted components, and then transmits the SADL integrated document to the repeater 300.

Successively, the repeater 300 applies DC 320 to the received SADL integrated document to thereby create primary SADL integrated document (54). Here, the DC 320 is DC about the terminal 200, which has not been received in the server 100 in operation 52 although it has been received in operation 51. Also, according to an aspect, DC about the terminal 200, stored in the repeater 300, may be additionally applied to create the primary SADL integrated document.

The process of applying the DC 320 may be performed by a pre-parser 310 of the repeater 300. The process is the same as the process of creating an application from SADL integrated document in the pre-parser 110 of the first example, and accordingly a detailed description therefor will be omitted.

Successively, the terminal 200 applies DC 240, that is, the remaining part of DC about the terminal 200, which has not been transmitted to the repeater 300 in operation 51, to the received primary SADL integrated document to thereby create an application 250 optimized for the terminal 200 (55). For this, the terminal 200 may perform a process of extracting DC 240 in advance. The process of applying the DC 240 may be performed by a pre-parser 210 of the terminal 200, and the process in which the pre-parser 210 creates the application 250 from the SADL integrated document is the same as that described in the first example, and accordingly, a detailed description therefor will be omitted. As a result, one or more components are selected and extracted from the SADL integrated document to thereby create the application 250 in at least one format of XHTM, JAVA, and FLASH. The application 250 is reproduced and executed by a processor 260 and then output through a display and/or an audio system of the terminal 200 so that a user can recognize the application 250 with his or her sense.

According to a modified example, it is possible to differentiate methods of applying DC and timings at which the DC is applied according to groups into which the DC is classified. The modified example may be, like the first and fourth examples and a sixth example which will be described later, applied to the case where at least two units applies DC.

Figure 13:
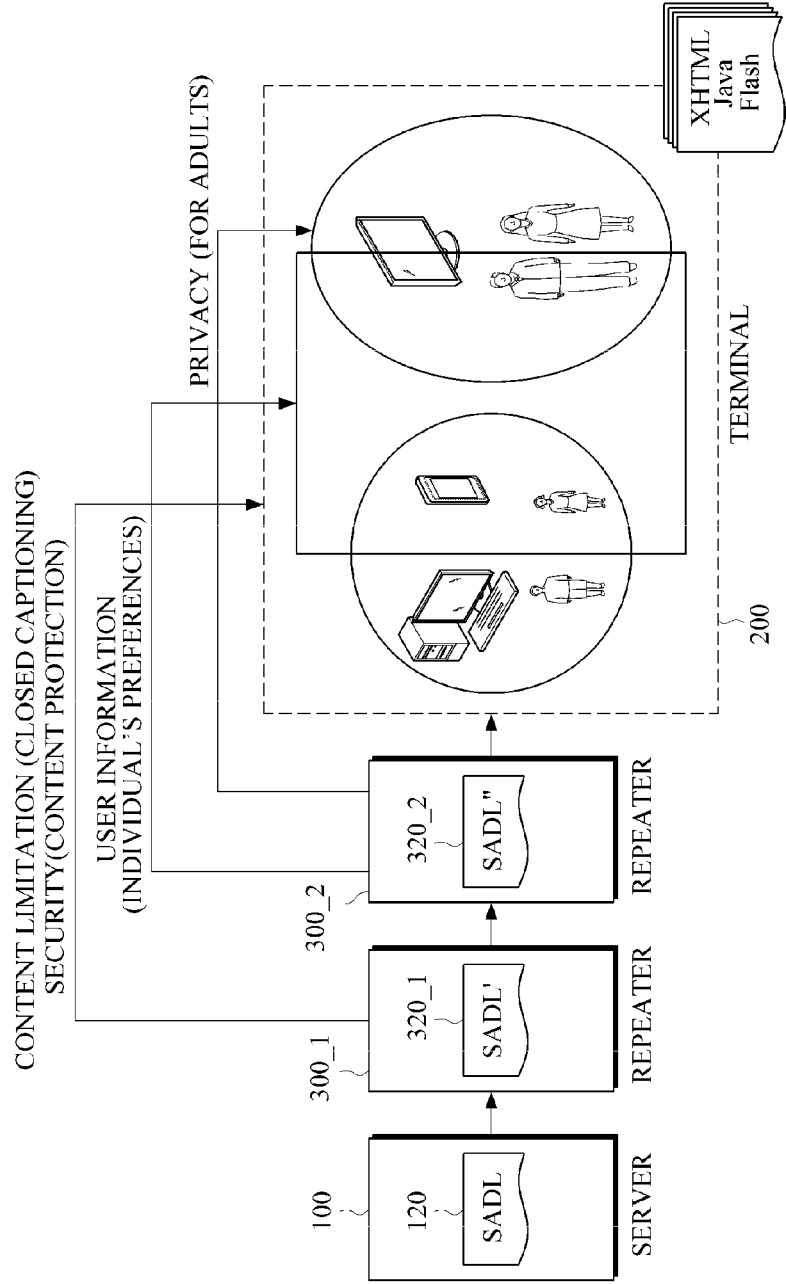
FIG. 13 is a view for explaining an example of classifying DC into several groups and differentiating timings at which DC is applied using a repeater by a policy.

FIG. 13 is a view for explaining an example of classifying DC into several groups and differentiating timings at which DC is applied using a repeater by a predetermined policy. Referring to FIG. 13, there are two repeaters (will be referred to as first and second repeaters 300_1 and 300_2) between a server 100 and various terminals 200 in a home network system. The repeaters 300_1 and 300_2 may be configured by a service provider or using a home server or a home gateway.

For example, if the first repeater 300_1 provides a client home network by applying DC associated with content limitation (for example, closed captioning) and security (for example, content protection) to SADL integrated document received from the server 100, the client home network uses a scalable application or primary SADL integrated document (SADL') 320_1 to which the DC has been primarily applied.

Also, the second repeater 300_2 is configured using the home server or the home gateway, and may apply DC associated with user information (for example, individual's preferences) or privacy (for example, for adults) to the scalable application or the primary SADL integrated document (SADL') 320_1 received from the first repeater 300_1. Accordingly, a scalable application or second SADL integrated document (SADL") 320_2 to which DC has been secondarily applied is created by the second repeater 300_2, and the scalable application or the second SADL integrated document (SADL") 320_2 is used to thereby provide a differentiated, optimized scalable application service to each terminal which belongs to the client home network. Therefore, DC groups and repeaters are used to provide various application services.

FIG. 13 relates to the case where two repeaters 300_1 and 300_2 are used to apply DC for each predetermined group, however, the current example is not limited to this. For example, one among a plurality of groups into which DC is classified may be used by the server 100 or the terminal 300, and the other groups may be used by one or more repeaters 300. Or, one of the plurality of groups may be used by the server 100, and the other groups may be used by the terminal 20. Or, one of the plurality of groups may be used by the server 100, another one may be used by the terminal 200, and the remaining one or more groups may be used by the one or more repeaters 300.

Sixth Example

Figure 14:
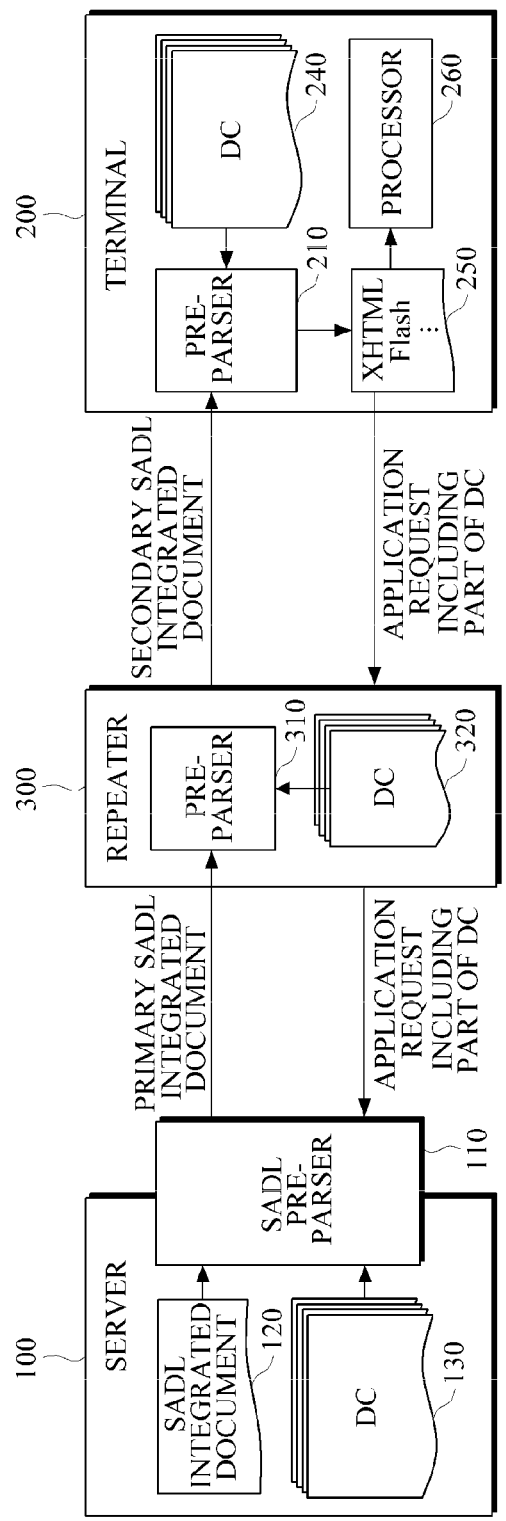
FIG. 14 is a view for explaining an application service method according to a sixth example.
Figure 15:
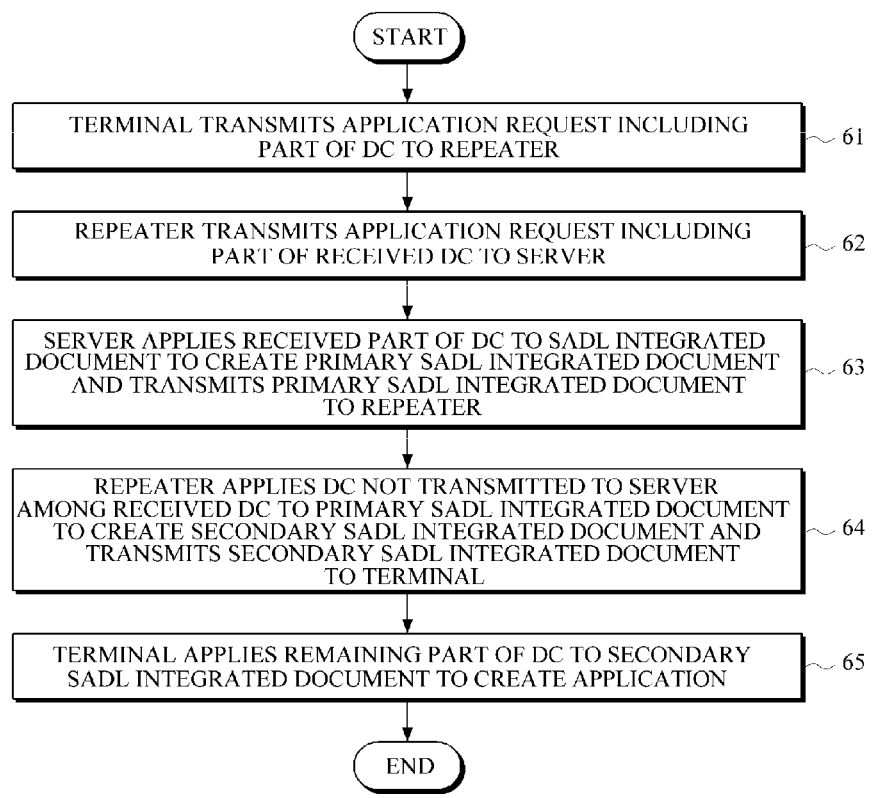
FIG. 15 is a flowchart illustrating the application service method according to the sixth example.

FIG. 14 is a view for explaining an application service method according to a sixth example, and FIG. 15 is a flowchart illustrating the application service method according to the sixth example. The sixth example corresponds to the case where a terminal 200 communicates with a server 100 via a repeater 150, wherein all of the server 100, the repeater 150, and the terminal 200 use DC. Hereinafter, the sixth example will be described based on differences from the first through fifth examples, and accordingly details not described in the following description can be referred to the above description about the first through fifth examples or will be understood by appropriately modifying the first through fifth examples.

Referring to FIGS. 14 and 15, the terminal 200 transmits an application request including DC about itself to the repeater 300 (61). That is, the repeater 300 receives an application request including DC. The application request that is transmitted to the repeater 300 may include a part of DC about the terminal 200. For this, the terminal 200 may perform a process of extracting DC that is to be transmitted to the repeater 300. Likewise, in the current example, if DC has been already stored in the server 100 and/or the repeater 300, the DC may be not included in the application request.

Successively, the repeater 300 may transmit the application request received from the terminal 200 to the server 100 (62). The application request that is transmitted from the repeater 300 to the server 100 also may include a part of the DC received from the terminal 200. According to an aspect, DC (not shown) about the repeater 300 may be included in the application request. The DC about the repeater 300 functions to inform the server 100 of the performance of the repeater 300, network environment information, etc.

Then, the server 100 which has received the application request from the repeater 300 applies the part of DC about the terminal 200 (that is, DC 130) to create primary SADL integrated document, and transmits the primary SADL integrated document to the repeater 300 (63). The process of applying the DC 130 to the SADL integrated document to create the primary SADL integrated document may be performed by a pre-parser 110 of the server 100. The DC 130 that is applied to create the primary SADL integrated document may be DC about the terminal 200, included in the application request received from the repeater 300. Together with the received DC 130, all or a part of DC about the terminal 200, stored in the server 100, may be applied to create the primary SADL integrated document.

Thereafter, the repeater 300 applies DC 320 to the received primary SADL integrated document to thereby create secondary SADL integrated document (64). Here, the DC 320 is DC that has not been transmitted to the server 100 in operation 62 although it has been received in operation 61, and the repeater 300 may apply the DC 320 to the primary SADL integrated document. According to an aspect, DC about the terminal 200, stored in the repeater 300, also may be additionally applied to create the secondary SADL integrated document. The process of applying a part of DC may be performed by a pre-parser 310 of the repeater 300, and is the same as the process of creating an application from SADL integrated document in the pre-parser 110 of the first example, and accordingly a detailed description therefor will be omitted.

Thereafter, the terminal 200 applies the remaining part of DC about itself, that is, DC 240 that has not been transmitted to the repeater 300 in operation 61, to the received secondary SADL integrated document to thereby create an application optimized for the terminal 200 (65). For this, the terminal 200 may perform a process of extracting DC about itself in advance. The process may be performed by a pre-parser 210 of the terminal 200, and a process in which the pre-parser 210 creates an application 250 from SADL integrated document has been described in detail in the first example, and a detailed description therefor will be omitted. As a result, one or more components are selected and extracted from the SADL integrated document to thereby create an application 250 in at least one format of XHTML, JAVA, and FLASH. The application 250 is reproduced and executed by a processor 260 and then output through a display and/or an audio system of the terminal 200 so that the user can recognize the application through his or her sense.

Figure 16:
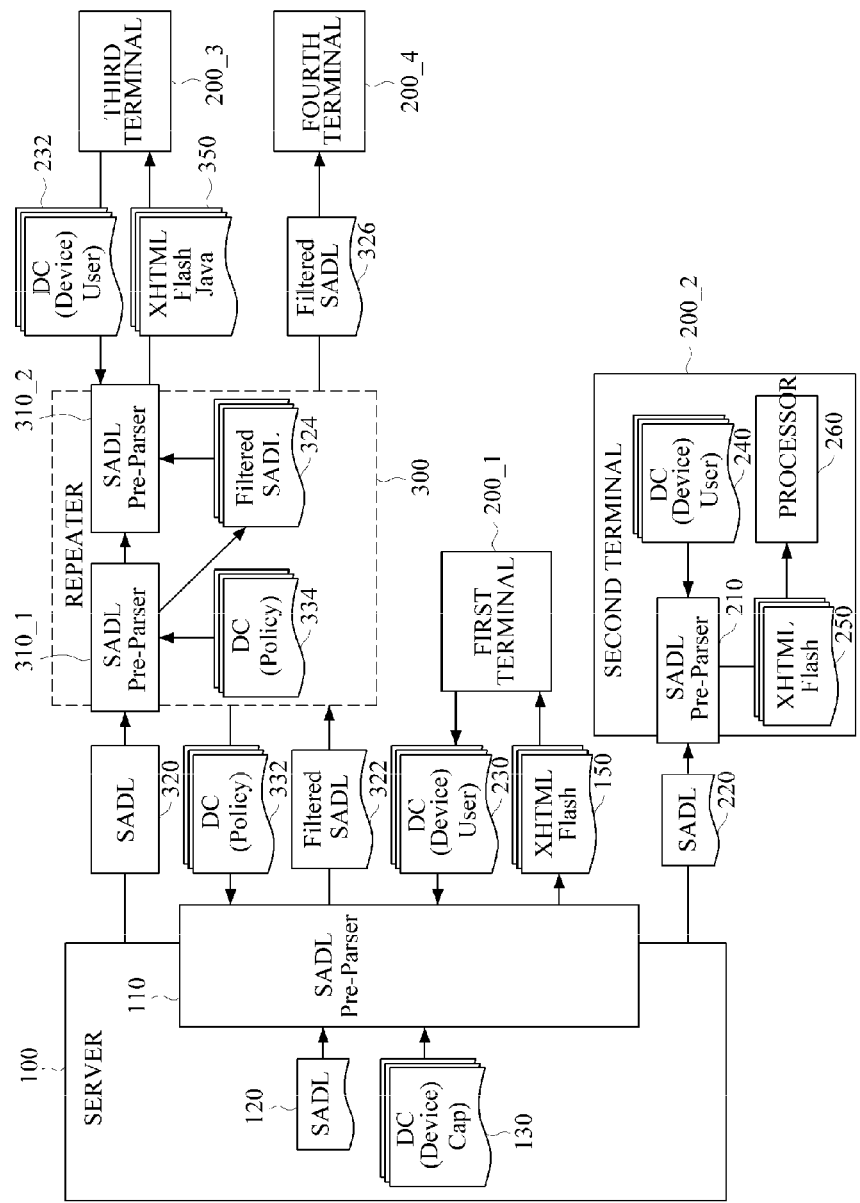
FIG. 16 is a view for explaining an example where the examples are integrated to adaptively provide an application service.

FIG. 16 is a view for explaining an example where the examples described above are integrated to adaptively provide an application service. FIG. 16 relates to the cases where only a server applies DC as described above in the first example, where only a terminal applies DC as described above in the second example, and where a plurality of repeaters apply DC for each group as described above in FIG. 13.

Referring to FIG. 16, a repeater 300 receives DC 232 from clients, that is, third and fourth terminals 200_3 and 200_4, transmits the DC 232 to a server 100, receives primary SADL integrated document to which the DC 232 has been primarily applied from the server 100, and then applies DC 334 to the primary SADL integrated document.

The repeater 300 applies, as described above, the DC 334 to the primary SADL integrated document using a pre-parser 310_2 of the repeater 300 to thereby create a scalable application 350 (or secondary SADL integrated document 326?) in the format reproducible or executable by a processor 260 of each of the third and fourth terminals 200_3 and 200_4 and transmits the scalable application 350 to the third terminal 200_3 or the secondary SADL integrated document 326 to the fourth terminal 200_4.

Finally, the terminal 200_4 applies DC to the secondary SADL integrated document 326 to thereby create an application executable by the processor 260 and then the application is displayed to a user. For this operation, the terminal 200_4 includes a pre-parser as described above.

According to the examples described above, by appropriately applying DC in various terminals and network environments to select and extract components from single integrated document and thereby providing an optimized application to each terminal, user convenience can be improved.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A scalable application service method comprising:
receiving an application request including a part of delivery context about a terminal from a repeater;

applying the part of the delivery context to first integrated document to extract one or more components from the first integrated document, thereby creating second integrated document consisting of the extracted components; and transmitting the second integrated document to the repeater so that the repeater applies the remaining part of the delivery context about the terminal to the second integrated document to extract one or more components, creates an application consisting of the extracted components, and then transmits the created application to the terminal, wherein the repeater receives all of the delivery context about the terminal, and the server receives a part of the delivery context about the terminal, received by the repeater.

2. A scalable application service method comprising:

receiving an application request including a part of delivery context about a terminal from a repeater;

applying the part of the delivery context to first integrated document to extract one or more components from the first integrated document, thereby creating second integrated document consisting of the extracted components; and transmitting the second integrated document to the repeater so that the repeater applies the remaining part of the delivery context about the terminal to the second integrated document to extract one or more components, creates an application consisting of the extracted components, and then transmits the created application to the terminal, wherein the receiving of the application request comprises receiving delivery context about the repeater, and the creating of the second integrated document comprise applying the delivery context about the repeater to the first integrated document.

* * * * *